July 31, 1956   E. D. GOODALE   2,757,232
LIGHT INTENSITY CONTROLLING OPTICAL SYSTEM
Filed April 21, 1952
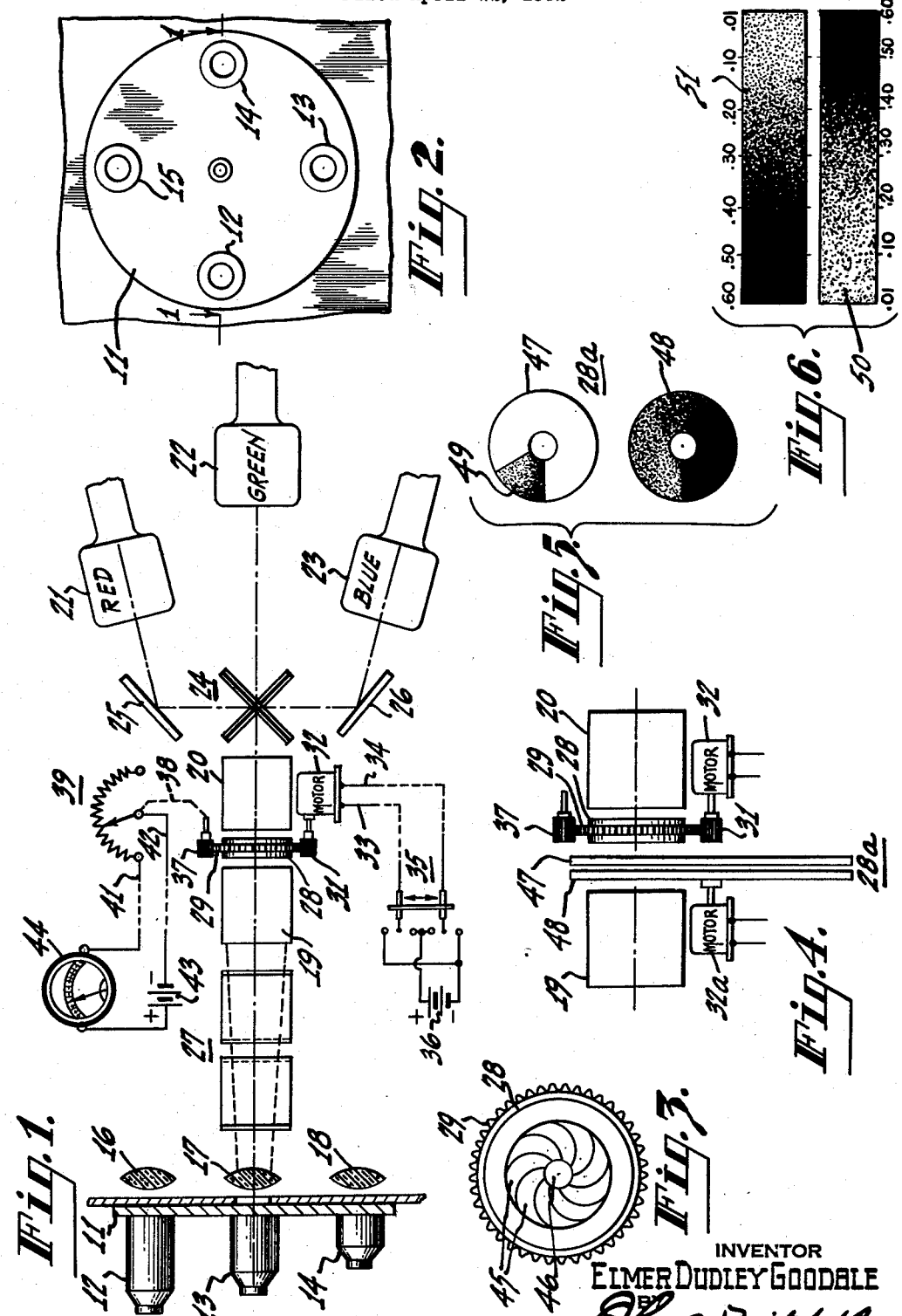
INVENTOR
ELMER DUDLEY GOODALE
BY
ATTORNEY

United States Patent Office 2,757,232
Patented July 31, 1956

2,757,232

LIGHT INTENSITY CONTROLLING OPTICAL SYSTEM

Elmer Dudley Goodale, New Rochelle, N. Y., assignor to Radio Corporation of America, a corporation of Delaware Application April 21, 1952, Serial No. 283,304

6 Claims. (Cl. 178—5.4)

This invention relates to optical systems and particularly to the control of the intensity of the light transferred by such systems.

In order to effect the desired operation of many optical systems, it is necessary to provide facilities for controlling the intensity of the light transferred through such systems. Where the optical system includes a plurality of interchangeable components it is necessary to provide the required light intensity control irrespective of the particular components being used.

One example of apparatus which usually is provided with an optical system of the type described is a television camera. The light from an object is transferred to the photosensitive apparatus by means of one of several objective lenses of different focal lengths. Ordinarily, these objective lenses are mounted in a rotatable turret so that a desired one may be selected for use. The usual arrangement with such apparatus is to provide an adjustable iris diaphragm in each of the objective lenses for the control of the light intensity.

It frequently is somewhat inconvenient for the camera operator to reach to the front of the camera so as to make the proper adjustment of the respective iris diaphragms in the different objective lenses as they are selected for use. Also, there is a duplication of light intensity-controlling apparatus such as an iris diaphragm.

The matter of physical inconvenience in the control of the light intensity in the manner described is greater in the case of some types of color television cameras. Usually, such cameras are somewhat bulkier than a black and white television camera by virtue of the inclusion therein of a plurality of video signal-producing tubes and some auxiliary optical apparatus required for color operation. In addition, the camera operator is provided with view-finding apparatus which in many cases is inadequate for the determination of the proper light intensity.

It, therefore, is an object of this invention to provide an optical system including improved apparatus for controlling the intensity of the light transferred by the system.

Another object of the invention is to provide an optical system including a plurality of objective lenses and which includes an improved apparatus for controlling the intensity of the light transferred by any selected one of the objective lenses.

A further object of the invention is to provide an improved light intensity-controlling apparatus for a television camera having a plurality of turret-mounted objective lenses selectible for operation.

Still another object of the invention is to provide an improved light intensity-controlling apparatus for a color television camera having an optical system which includes image-relaying apparatus.

In accordance with the present invention, there is provided an optical system which includes a plurality of objective lenses mounted for selective location between an object plane and an image plane, and light intensity-controlling apparatus located between a selected one of said objective lenses and the image plane. The light intensity-controlling apparatus is located in a zone where the light rays are substantially parallel and is adjustable so as to suitably vary the intensity of the transferred light, irrespective of the objective lens selected.

In a television camera embodiment of the present invention, the plurality of objective lenses is mounted in a turret which is rotatable for operative selection of any of the lenses. Where the invention is used in a color television camera, there is included, in the optical system, color-sensitive apparatus which is located between the selected objective lens and a plurality of video signal-producing tubes respectively responsive to different component colored light derived from the object. The light intensity-controlling apparatus, in such a case, is located between the selected objective lens and the color-selective apparatus. Such optical systems also usually include an image-relaying apparatus located between the selected objective lens and the color-selective apparatus. In these cases, the light intensity-controlling apparatus may be located adjacent to the image-relaying apparatus.

The novel features that are considered characteristic of this invention are set forth with particularity in the appended claims. The invention, itself, however, both as to its organization and method of operation, as well as additional objects and advantages thereof, will best be understood from the following description when read in conjunction with the accompanying drawings.

In the drawings:

Figure 1 is a view showing the general layout of the optical system for a color television camera embodying the present invention;

Figure 2 is a face or front view of an objective lens turret for a television camera such as used in the arrangement of Figure 1;

Figure 3 is a view of an iris diaphragm forming one kind of light intensity-controlling apparatus for use in accordance with this invention;

Figure 4 is a view showing a portion of an optical system such as that indicated in Figure 1 in which two kinds of light intensity-controlling apparatus are used;

Figure 5 is a view showing the components of a neutral density type of light intensity-controlling apparatus for use in accordance with the present invention; and, Figure 6 is a view of another form of neutral density filter which also may be used in accordance with this invention.

Reference first will be made to Figures 1 and 2 for a description of the general type of color television camera in which the present invention is embodied. The camera includes a light tight housing (not shown), at the front end of which is mounted a turret 11 in which are mounted a plurality of objective lenses such as 12, 13, 14 and 15. The turret is adapted to be rotated about an axis so as to bring selected ones of the objective lenses such as 13, into alignment with the rest of the optical system mounted inside of the camera housing. Field lenses, such as 16, 17 and 18, are provided for the respective objective lenses such as 12, 13 and 14. The field lenses are located in the focal planes of the comparatively short focal length objective lenses respectively associated therewith. Each field lens functions to effectively transfer the image formed in the focal plane of the associated objective lens to a relatively long focal length image-relaying apparatus of the type forming part of the subject matter of a copending application of L. T. Sachtleben and G. L. Dimmick, Serial No. 215,722, filed March 15, 1951, now Patent No. 2,672,072, granted March 16, 1954, and titled "Color Television Optical Systems."

The image-relaying apparatus comprises two relatively long focal length objective lenses 19 and 20 mounted respectively on the normally infinity conjugate side of one another. A substantially unit magnification is effected by this means. The image-relaying apparatus functions to relay the image to the photo-sensitive electrodes of each of a plurality of video signal-generating tubes such as the red, green and blue tubes 21, 22 and 23. These tubes are located relative to the optical system in such a way that the light paths to the tubes are substantially equal. The signal-generating tubes may be, for example, image orthicons of the general type disclosed in a paper titled "The image orthicon—a sensitive television pick-up tube" by A. Rose, P. K. Weimer and H. B. Law, published in the Proceedings of the IRE, vol. 34, July 1946, at page 424.

The light from the subject is separated into its primary colors by a color-selective light separator apparatus 24 comprising a pair of dichroic reflectors which, for example, may be of the general type shown in U. S. patents to G. L. Dimmick, 2,379,790 granted July 3, 1945, and titled "Dichroic Reflectors," and 2,412,496 granted Dec. 10, 1946, and titled "Color Selective Reflector." The reflectors are arranged respectively at approximately 45 degree angles to the axis of the system. An arrangement of this type forms the subject matter of a copending U. S. application of A. C. Schroeder, Serial No. 731,647, filed Feb. 28, 1947, now Patent No. 2,642,487, granted June 16, 1953, and titled "Component Color Separator." By such means the green subject light is transmitted by the color-selecting apparatus 24 directly to the green tube 22. The red light is reflected to one side by the color-selecting apparatus 24 and is directed by a mirror 25 to the red tube 21. Similarly, the blue light from the subject is reflected to the other side for further reflection by a mirror 26 to the blue tube 23.

The optical system also includes an astigmatism corrector 27 located between the field lenses such as 17, and the image-relaying apparatus including the objective lenses 19 and 20. As described in greater detail in the copending application of Sachtleben and Dimmick referred to, the angular relationship of the dichroic reflectors of the light separator 24 produce astigmatic images at the camera tubes 21, 22 and 23. This astigmatism may be compensated by the corrector 27 which includes another pair of plates similar to those included in the dichroic reflectors, also mounted at substantially the same angles to the axis of the system as are the dichroic reflectors of the light separator 24 but rotated about the axis through an angle of 90 degrees. It is seen that one set of plates creates astigmatism in one dimension and the other set in the other dimension, so that the two combined sets compensate for one another.

In accordance with the present invention there is also included in the optical system light-intensity controlling apparatus. It is desirable that this apparatus be located on the axis of the optical system in a zone where the light rays are substantially parallel. In the present system a convenient location of this character is in the image-relaying apparatus. Accordingly, the light intensity-controlling apparatus 28 is mounted between the two objective lens systems 19 and 20. The light intensity-controlling apparatus is provided with facilities such as a gear 29 located generally on the periphery thereof for the purpose of effecting adjustment by which to vary the intensity of the light. There also is provided a driving gear 31 which meshes with the gear 29 so that the rotation of the former effects a corresponding rotation of the latter. The driving gear is attached to the shaft of a driving motor 32. The driving motor may conveniently be a 6 volt, 4 R. P. M. D.-C. motor.

The driving motor 32 is adapted to be controlled from a remote point such as the video control room of a television station. Accordingly, conductors 33 and 34 are extended to such a remote point for connection to a double pole, double throw control switch 35. This switch is connected substantially in the manner shown to a suitable source of energy such as a 6 volt battery 36. It is seen that normally the switch 35 is maintained substantially in the position shown so that the motor 32 is deenergized. When it is desired to alter the intensity of the light transferred by the optical system, the switch 35 is operated to one or the other of its operating positions, thereby effecting a rotation of the motor 32 in either direction. Accordingly, the light intensity-controlling apparatus may be adjusted to either increase or decrease its control of the light transferred to the system.

In order that the operator at a remote point may be apprised of the adjustment of the light intensity-controlling apparatus 28, there also may be provided a driven gear 37 which is meshed with the gear 29 of the intensity controlling apparatus 28. There also is provided a mechanical linkage such as indicated by the broken line 38 to an adjustable contact of a current-controlling device such as a rheostat 39. Suitable electrical connections including conductors 41 and 42 are extended to the remote point for connection to a source of energy, such as represented by a battery 43, and to an indicating device such as a meter 44. The indicating device may be calibrated in terms, such as the f/number indicative of the effectiveness of the light intensity-controlling apparatus 28 to vary the light intensity. Any adjustment of the light intensity-controlling apparatus 28 by operation of the motor 32 is translated by the driven gear 37 to effect a similar adjustment of the rheostat 39. Hence, the current in the circuit including the indicating device 44 is correspondingly altered so that there is provided an indication of the adjustment of the light intensity-controlling apparatus.

Reference now will be made to Figure 3 for a description of one kind of light intensity-controlling apparatus which may be used in accordance with the present invention. In this case the intensity-controlling apparatus 28 is an iris diaphragm of the same general type commonly used in optical systems such as those associated with cameras and the like. It includes a plurality of overlapping leaves 45 arranged to define an aperture 46. The leaves are linked in a conventional manner to the adjusting mechanism including the gear 29 so that rotation of the gear apparatus effects a movement of the leaves in a manner suitable to vary the size of the aperture 46.

It has been found as a result of the use of an iris diaphragm for the light intensity control that, by locating it between the two objective lenses 19 and 20 of the image-relaying apparatus, it has little or no adverse effect on picture quality. Instead, it functions merely to change the amount of light which is transferred through the image-relaying apparatus. Such an iris diaphragm does, however, change the depth of the field of the image-relaying apparatus as in conventional optical practice. Hence, there are certain practical limitations relative to the degree to which the iris diaphragm can be stopped down without encountering a condition in which a bar is produced in the image transferred to the signal-generating tubes produced by the intersection of the dichroic reflectors 24. In practice, it has been found that a minimum aperture of approximately f/11 in such an arrangement gives satisfactory performance for most indoor studio uses. There are, however, uses for television cameras in which it is desirable to produce attenuation of the light in addition to that possible by use of an iris diaphragm stopped to f/11. One such situation is in using the camera for out-of-door pick-ups.

By referring now to Figure 4, there is shown one arrangement which may be employed to effect additional attenuation of the light. It will be understood that the image-relaying apparatus including the objective lenses 19 and 20 shown in this figure are only a part of an optical system such as that shown in Figure 1. In this case, an iris diaphragm 28 is mounted between the two objective lenses 19 and 20 of the image-relaying apparatus as in the embodiment previously described. Also, the control of the iris diaphragm will be understood to be substantially the same as in the preceding instance. In this case, however, there is also included in the space between the objective lenses 19 and 20 of the image-relaying apparatus, a second light intensity-controlling apparatus 28a. It also will be understood to be subject to control by means of a suitable linkage to a driving motor 32a.

The light intensity-controlling apparatus 28a in this case is a variable neutral density filter which may be substantially of the form shown in Figure 5. Essentially it consists of two discs 47 and 48, the variable density portions of which are in the light path and which are arranged for relative rotation. The disc 48, which will be assumed to be rotatable by means of an attachment to the shaft of the driving motor 32a, varies in density in a substantially uniform, or other desired, manner at successive points about the circumference thereof. It will be understood that the variation in density is angular, but not radial. The disc 47 is clear except for a sector 49 of a size corresponding to that of the light beam to the camera tubes 21, 22 and 23. The density of the sector 49 also varies angularly, but not radially, through substantially the same range as the least dense sector of the disc 48. In the illustrated form of the invention, the disc 47 is maintained substantially stationary and the disc 48 is rotated relative thereto by means of the described mechanism.

Another form of a variable neutral density filter which may be employed in accordance with the present invention is shown in Figure 6 to which reference now will be made. This variable neutral density filter consists of two strips 50 and 51 of material which varies in density from one end to the other of the respective strips. Both of these strips are placed in the light path in a region in which the light rays are substantially parallel, such as in the region between the two objective lenses 19 and 20 of the image-relaying apparatus. The variation in density of the strips 50 and 51 may be substantially as indicated in this figure. In order to effect a variation in the attenuation of the transferred light, one or both strips may be moved laterally relative to one another so as to place different areas of the two strips concurrently in the light path. It may be seen, that if the density variation of the disc 48 of Figure 5 is substantially the same as that of either of the strips 50 and 51, the arrangement of Figure 6 provides double the light attenuation of the apparatus of Figure 5. Either neutral density arrangement may be provided in disc, strip or other equivalent form.

It will be understood that, in accordance with the present invention, the light intensity-controlling apparatus may consist of an iris diaphragm, or a variable neutral density filter of either of the two types shown respectively in Figures 5 and 6 or equivalents thereof, or a combination of both iris diaphragm and neutral density filter such as illustrated in Figure 4.

From the foregoing description of several illustrative embodiments of the invention it is seen that there is provided an optical system which includes improved apparatus for controlling the intensity of the light transferred by the system. Such improved apparatus is particularly useful with equipment in which the optical system includes a plurality of objective lenses which may be selectively placed in operation. A television camera having a plurality of turret-mounted objective lenses which may be selectively controlled for operation is a particular apparatus with which the present invention is well suited for use. Also, in the case of a color television camera in which an optical system includes image-relaying apparatus, the principles of the present invention may be advantageously employed by placing the light intensity-controlling apparatus in the image-relaying apparatus.

The nature of the invention may be ascertained from the foregoing disclosure of several illustrative embodiments thereof. The scope of the invention is pointed out in the appended claims.

What is claimed is:

1. An optical system for a television camera having a video signal-producing tube comprising, a plurality of different relatively short focal length objective lenses mounted in a turret which is rotatable for selectively locating different ones of said objective lenses between an object and said video signal-producing tube, means located in the light path between said selected turret mounted objective lens and said tube for producing substantially parallel light rays in a given zone, and light intensity-controlling apparatus located in said light path between said turret-mounted objective lenses and said video signal-producing tube in said zone where the light rays are substantially parallel, said light intensity-controlling apparatus being adjustable independently of said objective lenses to similarly vary the light transferred to said tube irrespective of which objective lens is selected for location between said object and said tube.

2. An optical system for a color television camera having a video signal-producing tube for each of a plurality of component colors of an object comprising, a relatively short focal length objective lens located between said object and the region of said tubes, color-selective apparatus including a dichroic reflector located between said objective lens and said tubes, image-relaying apparatus comprising two similar lens systems located in the light path between said objective lens and said color-selective apparatus, said two similar lens systems being of such a character and being so disposed relative to one another to effectively transfer the focal plane of said objective lens to the region of said tubes, and light intensity-controlling apparatus located in said light path between the two lens systems of said image-relaying apparatus and operable to vary in substantially the same proportions the differently colored light transferred to respective ones of said video signal-producing tubes.

3. An optical system for a color television camera having a video signal producing tube for each of a plurality of component colors of an object comprising, a plurality of different relatively short focal length objective lenses mounted in a turret which is rotatable for selectively locating different ones of said objective lenses between said object and said video signal producing tubes, color selective apparatus including a dichroic reflector located between said objective lens and said tubes, image relaying apparatus comprising two similar objective lens systems located in the light path between said selected turret mounted objective lens and said color selective apparatus, said two similar objective lens systems being mounted with their normally infinity conjugate sides adjacent to one another, and an iris diaphragm located in said light path between the two similar objective lens systems of said image relaying apparatus and adjustable to vary in substantially the same proportions the differently colored light transferred to respective ones of said video signal producing tbues.

4. An optical system for a television camera having a video signal-producing tube comprising, a plurality of different relatively short focal length objective lenses mounted in a turret which is rotatable for selectively locating different ones of said objective lenses between an object and said video signal-producing tube, means located in the light path between said selected turret-mounted objective lens and said tubes for producing substantially parallel light rays in a given zone, and a light intensity-controlling variable neutral density filter located in said light path between said turret-mounted objective lenses and said video signal-producing tube in said zone where the light rays are substantially parallel, said variable neutral density filter being adjustable independently of said objective lenses to similarly vary the light transferred to said tube irrespective of which objective lens is selected for location between said object and said tube.

5. An optical system for a television camera having a video signal-producing tube comprising, a plurality of different relatively short focal length objective lenses mounted in a turret which is rotatable for selectively locating different ones of said objective lenses between an object and said video signal-producing tube, means located in the light path between said selected turret-mounted objective lens and said tube for producing substantially parallel light rays in a given zone, and a light intensity-controlling iris diaphragm located in said light path between said turret-mounted objective lenses and said video signal-producing tube in said zone where the light rays are substantially parallel, said iris diaphragm being adjustable independently of said objective lenses to similarly vary the light transferred to said tube irrespective of which objective lens is selected for location between said object and said tube.

6. An optical system for a television camera having a video signal-producing tube comprising, a plurality of different relatively short focal length objective lenses mounted in a turret which is rotatable for selectively locating different ones of said objective lenses between an object and said video signal-producing tube, means located in the light path between said selected turret-mounted objective lens and said tube for producing substantially parallel light rays in a given zone, and light intensity controlling apparatus including an iris diaphragm and a variable neutral density filter located in said light path between said turret-mounted objective lenses and said video signal-producing tube in said zone where the light rays are substantially parallel, said iris diaphragm and said variable neutral density filter being adjustable independently of said objective lenses to similarly vary the light transferred to said tube irrespective of which objective lens is selected for location between said object and said tube.

References Cited in the file of this patent

UNITED STATES PATENTS

| | | |
|---|---|---|
| 1,629,974 | Russo | May 24, 1927 |
| 2,391,430 | Macek | Dec. 25, 1945 |
| 2,510,374 | Brady | June 6, 1950 |
| 2,531,031 | De France | Nov. 21, 1950 |
| 2,536,866 | Barcus | Jan. 2, 1951 |
| 2,607,845 | Clark | Aug. 19, 1952 |
| 2,632,370 | Shepard | Mar. 24, 1953 |
| 2,672,072 | Sachtleben et al. | Mar. 16, 1954 |

FOREIGN PATENTS

| | | |
|---|---|---|
| 945,960 | France | Dec. 6, 1948 |